(12) United States Patent
Choi et al.

(10) Patent No.: US 9,716,675 B2
(45) Date of Patent: Jul. 25, 2017

(54) METHOD AND SYSTEM FOR CONTROLLING INTERNET OF THINGS (IOT) DEVICE

(71) Applicant: Korea Advanced Institute of Science and Technology, Daejeon (KR)

(72) Inventors: Jun Kyun Choi, Daejeon (KR); Kyu Yeong Jeon, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 141 days.

(21) Appl. No.: 14/625,441

(22) Filed: Feb. 18, 2015

(65) Prior Publication Data

US 2016/0105292 A1    Apr. 14, 2016

(30) Foreign Application Priority Data

Oct. 13, 2014    (KR) .................. 10-2014-0137556

(51) Int. Cl.
| | |
|---|---|
| *G06F 15/16* | (2006.01) |
| *H04L 12/58* | (2006.01) |
| *H04L 12/18* | (2006.01) |
| *H04L 12/28* | (2006.01) |
| *H04L 29/08* | (2006.01) |

(52) U.S. Cl.
CPC .......... *H04L 51/02* (2013.01); *H04L 12/1818* (2013.01); *H04L 12/2816* (2013.01); *H04L 12/1822* (2013.01); *H04L 67/12* (2013.01); *H04L 2012/2847* (2013.01)

(58) Field of Classification Search
CPC .................. H04L 12/2805–12/2838; H04L 2012/284–2012/285; H04L 67/12; H04L 69/26
See application file for complete search history.

(56) References Cited

U.S. PATENT DOCUMENTS

| | | | | |
|---|---|---|---|---|
| 7,310,344 B1* | 12/2007 | Sue | ...................... | H04L 12/2803 370/410 |
| 7,519,073 B2* | 4/2009 | Caspi | .................. | H04L 12/2803 348/734 |
| 7,539,724 B1* | 5/2009 | Callaghan | .......... | G05B 19/4185 700/9 |
| 7,640,066 B2* | 12/2009 | Rayburn | ............. | H04L 12/2803 340/3.1 |

(Continued)

OTHER PUBLICATIONS

Choi, Jongmyung, and Chae-Woo Yoo. "Connect with things through instant messaging." The Internet of Things. Springer Berlin Heidelberg, 2008. 276-288.*

(Continued)

*Primary Examiner* — David Lazaro
*Assistant Examiner* — Julian Chang
(74) *Attorney, Agent, or Firm* — Marshall, Gerstein & Borun LLP (57) ABSTRACT

Provided is a method and system for controlling an Internet of Things (IoT) device. An IoT control method configured as a computer may include registering an IoT device as a buddy through an open application programmer interface (API) of a messenger service platform; creating a group chat room by grouping a plurality of IoT devices among IoT devices registered as the buddy; and providing a messaging service participated in by the plurality of IoT devices through the group chat room.

11 Claims, 10 Drawing Sheets

(56) References Cited

U.S. PATENT DOCUMENTS

| | | | | |
|---|---|---|---|---|
| 8,447,814 | B2* | 5/2013 | Solyanik | H04L 12/2818 709/206 |
| 9,009,230 | B1* | 4/2015 | Matthieu | H04L 67/12 709/204 |
| 2003/0078979 | A1* | 4/2003 | Sagi | H04L 12/581 709/206 |
| 2003/0117280 | A1* | 6/2003 | Prehn | G08B 13/19656 340/540 |
| 2004/0103153 | A1* | 5/2004 | Chang | H04L 12/2602 709/206 |
| 2007/0286181 | A1* | 12/2007 | Bushmitch | H04L 12/2803 370/356 |
| 2008/0037755 | A1* | 2/2008 | Glasgow | H04L 12/581 379/218.01 |
| 2008/0147880 | A1* | 6/2008 | Morris | H04L 12/2807 709/238 |
| 2010/0071053 | A1* | 3/2010 | Ansari | G06Q 30/04 726/12 |
| 2010/0293241 | A1* | 11/2010 | Bishel | H04L 12/2814 709/206 |
| 2013/0054863 | A1* | 2/2013 | Imes | H04L 12/2827 710/304 |
| 2013/0214935 | A1* | 8/2013 | Kim | G08C 17/02 340/870.02 |
| 2014/0095638 | A1* | 4/2014 | Chen | H04L 51/046 709/206 |
| 2014/0156028 | A1* | 6/2014 | Subramaniam | H04L 12/2818 700/11 |
| 2014/0244710 | A1* | 8/2014 | Sharma | H04L 67/12 709/201 |
| 2015/0067080 | A1* | 3/2015 | Cho | H04W 4/12 709/206 |
| 2015/0134116 | A1* | 5/2015 | Li | H04L 51/32 700/275 |
| 2015/0188855 | A1* | 7/2015 | Liu | H04L 67/125 709/206 |
| 2016/0072670 | A1* | 3/2016 | Matthieu | H04L 67/12 709/204 |
| 2016/0277205 | A1* | 9/2016 | Liu | H04L 12/2816 |
| 2016/0301638 | A1* | 10/2016 | Chen | H04L 51/32 |

OTHER PUBLICATIONS

Choi, Jongmyung, et al. "Issues for applying instant messaging to smart home systems." International Conference on Computational Science and Its Applications. Springer Berlin Heidelberg, 2009.*

Alkar, Ali Ziya, John Roach, and Dilek Baysal. "IP based home automation system." IEEE Transactions on Consumer Electronics 56.4 (2010): 2201-2207.*

Aurell, Simon. "Remote controlling devices using instant messaging: building an intelligent gateway in Erlang/OTP." Proceedings of the 2005 ACM SIGPLAN workshop on Erlang. ACM, 2005.*

Blackstock, Michael, et al. "MAGIC Broker 2: An open and extensible platform for the Internet of Things." Internet of Things (IOT), 2010. IEEE, 2010.*

Klauck, Ronny, and Michael Kirsche. "Chatty things-Making the Internet of Things readily usable for the masses with XMPP." Collaborative Computing: Networking, Applications and Worksharing (CollaborateCom), 2012 8th International Conference on. IEEE, 2012.*

* cited by examiner

METHOD AND SYSTEM FOR CONTROLLING INTERNET OF THINGS (IOT) DEVICE

CROSS-REFERENCE TO RELATED APPLICATION

This application claims the priority benefit of Korean Patent Application No. 10-2014-0137556, filed on Oct. 13, 2014, in the Korean Intellectual Property Office, the disclosure of which is incorporated herein by reference.

BACKGROUND

1. Field of the Invention

Embodiments of the present invention relate to a method and system for controlling and monitoring a group of Internet of Things (IoT) devices or a mash-up service.

2. Description of the Related Art

The Internet of Things (IoT) indicates the concept that mutual communication is enabled by connecting all the communicable things over a network. All the systematically recognizable objects may be classified as things or objects. A thing, such as a sensor, including near field and far field communication functions and capable of creating and utilizing data or a person may be included therein.

For example, a technology for receiving menu information and seat information and processing a reservation and a payment using a mobile device through an IoT point of sales (POS) system in which an IoT service is applied to a POS is disclosed in Korean Patent Laid-Open Publication No. 10-2014-0008668 titled "method for providing IoT POS service and computer readable recording medium applying the same", published on Jan. 22, 2014.

There is a need to execute an exclusive application or to access a web in order to activate or monitor each of IoT devices in an IoT environment.

In the case of controlling a grouping of IoT devices and a mash-up service using an exclusive application, learning of a new tool is required instead of using a method familiar to a user. Also, a separate manager or server capable of managing each of IoT devices and providing a messaging service between devices is required.

Similarly, in the case of controlling a grouping of IoT devices and a mash-up service through a web, the same issues as the method using the exclusive application may arise.

The number of IoT devices will greatly increase. Further, although such IoT devices are operating in a standalone style, a plurality of IoT devices may be evolved to cooperate to provide a further intelligent service. In this perspective, there is a need to provide a user friendly interface in a buddy type of a messenger rather than a method of controlling an application or a web of an interface, which can be regarded to be relatively unfriendly and difficult.

SUMMARY

An aspect of the present invention provides an Internet of Things (IoT) control method and system that may control an IoT device using a buddy concept friendly to users.

An aspect of the present invention also provides an IoT control method and system that may control and monitor a group of IoT devices or a mash-up service through a multilateral chat room of a messenger.

According to an aspect of the present invention, there is provided an IoT control method configured as a computer, the method including registering an IoT device as a buddy through an open application programmer interface (API) of a messenger service platform; creating a group chat room by grouping a plurality of IoT devices among IoT devices registered as the buddy; and providing a messaging service participated in by the plurality of IoT devices through the group chat room.

The registering may include registering a corresponding IoT device as a buddy having set a relationship with a user, in response to identification information of the IoT device input from the user.

The registering may include registering the IoT device based on device information input from a manager associated with a development or sales of the IoT device; and registering a corresponding IoT device as a buddy having set a relationship with a user, in response to identification information of the IoT device input from the user of which a user authentication is completed.

The creating may include creating the group chat room by grouping a plurality of IoT devices selected by a user from among IoT device registered as the buddy.

The creating may include creating the group chat room by grouping a plurality of IoT devices based on a service category of the IoT device registered as the buddy.

The IoT control method may further include registering, as the buddy, an external service server that provides data required for controlling the IoT device. The creating may include creating the group chat room by including at least one external service server.

The providing may include controlling, as a group, the plurality of IoT devices through the messaging service or configuring a mash-up service using the plurality of IoT devices.

Each of the IoT devices participating in the group chat room may transmit and receive a message through the open API of the messenger service platform.

According to another aspect of the present invention, there is provided an IoT control system including a memory to which at least one program is loaded; and at least one processor. According to a control of the at least one program, the at least one processor may be configured to process: a process of registering an IoT device as a buddy through an open API of a messenger service platform; a process of creating a group chat room by grouping a plurality of IoT devices among IoT devices registered as the buddy; and a process of providing a messaging service participated in by the plurality of IoT devices through the group chat room.

Effects

According to embodiments of the present invention, users may be provided with an intelligent service by grouping Internet of Things (IoT) devices through a user friendly interface instead of using a difficult tool.

Also, according to embodiments of the present invention, it is possible to easily perform grouping or construct a mash-up service by registering, using a buddy system such as a messenger, each IoT device as a virtual buddy, by creating a multilateral chat room, and by inviting a plurality of IoT buddies to the created multilateral chat room.

Also, according to embodiments of the present invention, since IoT buddies exchange messages through a messenger server, an exclusive application or an additional server construction is not required. Further, since operation details of an IoT device or communication details between IoT devices remain in a chat room, logging or monitoring may be easily performed.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. Embodiments are described below to explain the present invention by referring to the figures.

Hereinafter, embodiments of the present invention will be described with reference to the accompanying drawings.

The embodiments relate to a technology capable of controlling and monitoring a group of Internet of Things (IoT) devices or a mash-up service through an interaction between a platform of an instant messenger service and IoT devices, and may be applicable to a device control service in an IoT environment.

Figure 1:
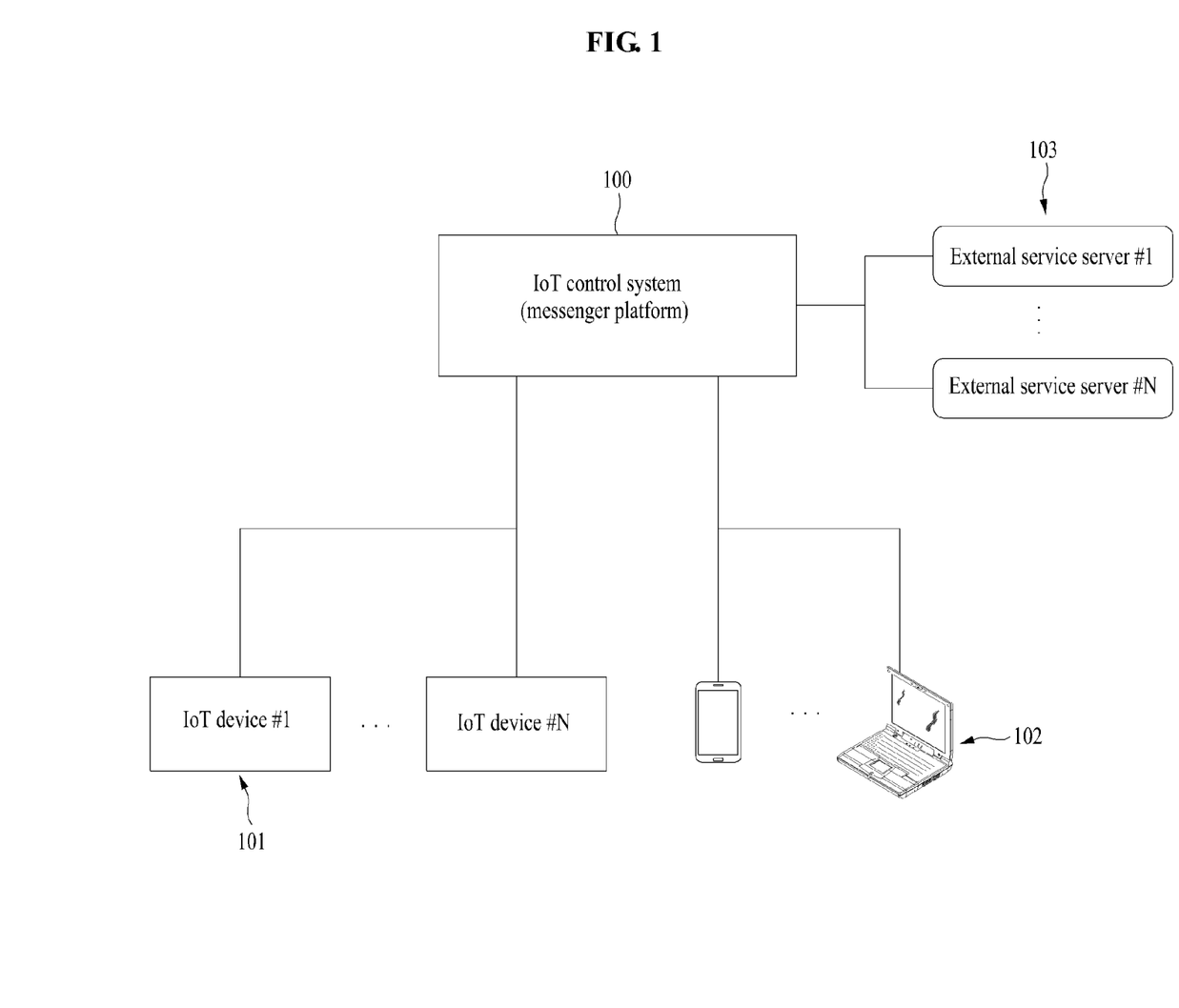
FIG. 1 illustrates an example of an environment capable of grouping and thereby controlling an Internet of Things (IoT) device according to an embodiment of the present invention.

FIG. 1 illustrates an example of an environment capable of grouping and thereby controlling an IoT device according to an embodiment of the present invention. FIG. 1 illustrates an IoT device 101, an IoT control system 100, and a user terminal 102. In FIG. 1, lines connecting between constituent elements indicate that data may be transmitted and received between the IoT device 101 and the IoT control system 100 and between the IoT control system 100 and the user terminal 102 over a wired/wireless network.

The IoT device 101 may indicate a smart grid system to manage energy including electricity/gas or water and sewage, a home network system to integrally manage home cooling and heating, and all the smart devices or sensors regarded as an IoT technology based service target such as a smart key capable of automatically unlocking a locking device of a vehicle door or automatically starting an engine without fixing a key to a vehicle.

The user terminal 102, as a communication device such as a personal computer (PC), a smartphone, a tablet, and a wearable computer, may indicate any type of terminal devices that may install and execute a service exclusive application (hereinafter, referred to as a "messenger App") associated with the IoT control system 100. Here, the user terminal 102 may perform the overall service operation such as a service screen configuration, a data input, a data transmission and reception, and a data storage under a control of the messenger App.

An external service server 103 refers to a database system to manage data of a $3^{rd}$ party service provider or data of an outside public provider. For example, the external service server 103 may provide outside public data, such as weather information and traffic information, or data of a predetermined service provider as external data required to control the IoT device 101.

In an instant messenger service generally used by users, the IoT control system 100 may recognize the IoT device 101 in a form of a buddy and may provide an environment of controlling the IoT device 101 using a conversation function familiar to users. As an example, the IoT control system 100 is constructed on a messenger platform that provides a messenger service, and may register each IoT device 101 as a virtual buddy based on a messenger and may provide a grouping of IoT devices 101 or a mesh-up service through a multilateral chat room. Also, the IoT control system 100 may transfer, to the IoT device 101, data provided from the external service server 103 in response to a connection or a request of the IoT device 101 in the messenger environment.

The IoT control system 100 may be included in a platform of a messenger server (not shown) that provides the messenger service. However, the present invention is not limited thereto and thus, the IoT control system 100 may be configured as a system separate from the messenger server and to provide a grouping of IoT devices 101 or a mash-up service through an interaction with the messenger server.

Figure 2:
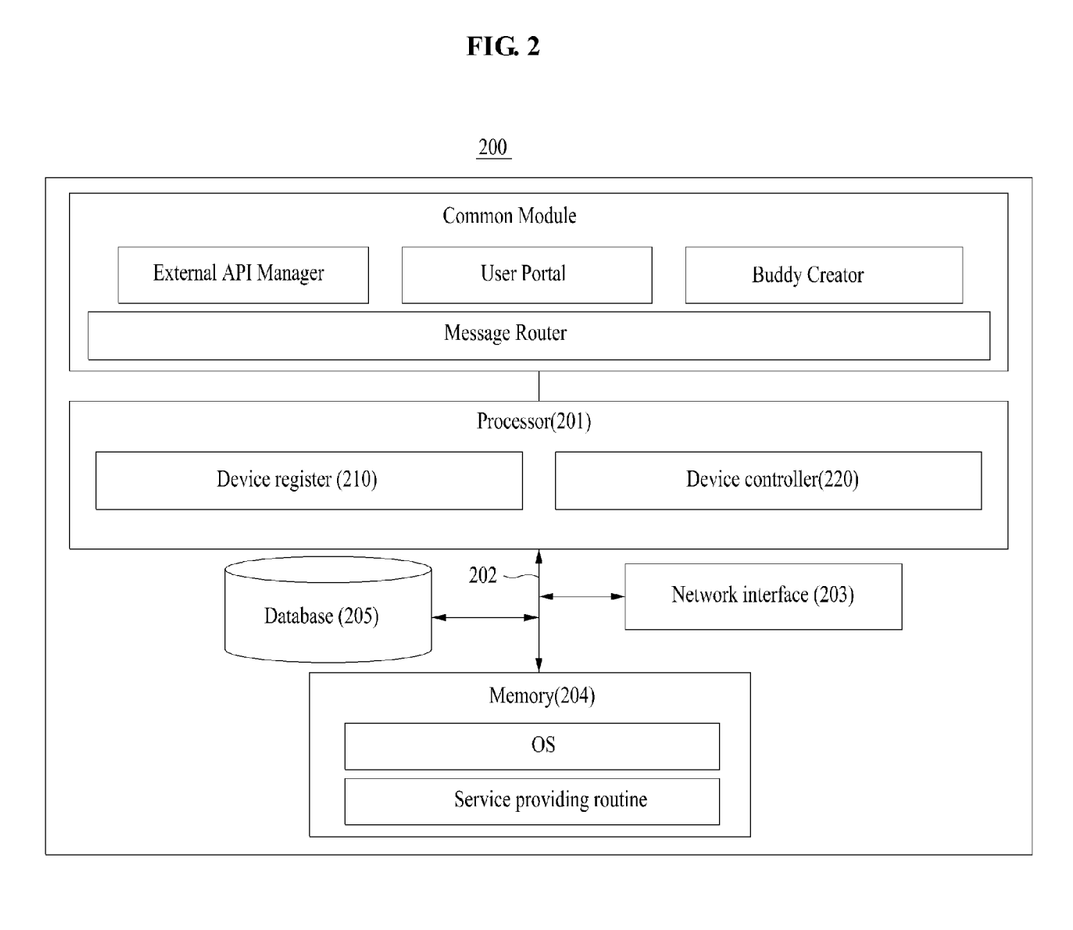
FIG. 2 is a block diagram illustrating a configuration of an IoT control system according to an embodiment of the present invention.

FIG. 2 is a block diagram illustrating a configuration of an IoT control system 200 according to an embodiment of the present invention.

Referring to FIG. 2, the IoT control system 200 may include a processor 201, a bus 202, a network interface 203, a memory 204, and a database 205. The memory 204 may include an operating system (OS) and a service providing routine. The processor 201 may include a device register 210 and a device controller 220. Depending on embodiments, the IoT control system 200 may include the number of constituent elements greater than the number of constituent elements of FIG. 2.

The memory 204, as non-transitory computer-readable media, may include a permanent mass storage device such as random access memory (RAM), read only memory (ROM), and a disk drive. Also, a program code for the OS and the service providing routine may be stored in the memory 204. The software constituent elements may be loaded from non-transitory computer-readable media separate from the memory 204 using a drive mechanism (not shown). The non-transitory computer-readable media may include computer-readable media such as a floppy disk, a tape, a DVD/CD-ROM drive, and a memory card. According to another embodiment, the software constituent elements may be loaded to the memory 204 through the network interface 203, instead of using the non-transitory computer readable media.

The bus 202 may enable communication and data transmission between the constituent elements of the IoT control system 200. The bus 202 may be configured using a high-speed serial bus, a parallel bus, a storage area network (SAN), and/or other appropriate communication technologies.

The network interface 203 may be a computer hardware constituent element to connect the IoT control system 200 to a computer network. The network interface 203 may connect the IoT control system 200 to the computer network through a wireless or wired connection.

The database 205 may serve to store and maintain all the information required to control an IoT device based on a messenger service. In this instance, the database 205 may include a device message repository to store a device message associated with the IoT device, a device information repository to store basic information about the IoT device, an upper ontology for interface with the IoT device, a conversation vocabulary database to store vocabulary for a conversation function between a user and the IoT device, a service template repository to store a service template for a conversion function between the user and the IoT device, a user information repository to store user information using a service, and a buddy information repository to store buddy information between the user and the IoT device. Although FIG. 2 illustrates that the database 205 is included in the IoT control system 200, the database 205 may be present as an external database constructed on a separate system.

The processor 201 may be configured to process an instruction of a computer program by performing a basic arithmetic and logic operation, and an input/output (I/O) operation of the IoT control system 200. The instruction may be provided from the memory 204 or the network interface 203 to the processor 201 through the bus 202. The processor 201 may be configured to execute a program code for the device register 210 and the device controller 220. The program code may be stored in a storage device such as the memory 204.

Hereinafter, an operation of the device register 210 and the device controller 220 will be described in detail.

Initially, the device register 210 serves to register an IoT device on a system in a form of a buddy. As an example, the device register 210 may register device information input from a manager, for example, a developer and a seller, of the IoT device to the IoT control system 200. As another example, the device register 210 may perform a direct device registration function that enables a user corresponding to an owner of the IoT device to directly register the IoT device to a service of the IoT control system 200. The manager or the user may input basic information, for example, a device name, spatial information, and tagging information, of the IoT device using a user portable on a system for registration of the IoT device, and may select or directly input individual interface information in the case of automatically providing the same. As described above, the IoT device may be registered to the messenger based IoT control system 200 to be suitable for each service category. At the event of registration, information such as a name, a type, a media access control (MAC) address, a service category, and an owner of the IoT device may also be stored.

The device register 210 aims to manage buddy information with respect to the registered IoT device, and serves to manage authentication and connection information associated with a messenger service. As an example, the device register 210 serves to perform a buddy creation and recognition function with respect to the IoT device, and may provide a virtual buddy service for authenticating the IoT device as a buddy on the messenger service through interaction with a general messenger service provider. As another example, the device register 210 may provide a connection function with respect to a service that adds a buddy using virtual telephone number or e-mail based information associated with the IoT device to be associated with a non-interacting provider.

Further, the device register 210 may register, as a single buddy, a third information provider that is an external service providing outside public data, such as weather information and traffic information, or predetermined service data.

Also, the device register 210 may perform a device application programmer interface (API) based registration function capable of registering API information associated with the IoT device. In this instance, the device register 210 may connect the IoT device through an API provided from an IoT device provider or another separate external service server, and here, may input API information of the IoT device using a user portal of a system and may set a relevant right. The device register 210 may perform a device interface registration function capable of setting individual interface information based on information provided for each IoT device. Here, interface information of the IoT device may be set based on predefined semantic interface information. Based thereon, message conversion and service operation inference may be performed on the device register 210. The interface information for each IoT device may be verified from an upper ontology structure and a function suitable for the IoT device may be provided by inferring and selecting related control information.

The device controller 220 may provide a messaging service between a user and the IoT device and between the IoT device and another IoT device in a messenger environment. To this end, the device controller 220 may provide a conversation function capable of creating a chat room in which the user and the IoT device participate and controlling the IoT device using a conversation type instruction through the chat room.

Here, to overcome the user inconvenience when using an IoT device interactive service, the device controller 220 may provide a predefined service template capable of setting a message routing and relationship between buddies, and in this instance, may utilize a structure such as a mesh-up interface of instance hosting technology.

In particular, in the case of using a service provided in a mash-up form with respect to a plurality of IoT devices, the device controller 220 may provide a group chat environment in which the plurality of IoT devices is grouped. That is, the device controller 220 may create a group chat room capable of grouping the plurality of IoT devices or configuring a mash-up service by combining the plurality of IoT devices by the user or the system.

The device controller 220 may serve to receive a device message from an IoT device participating in a chat room with the user, and to process the received device message in a queue form.

In the conversation function, the device controller 220 may change a message transmitted or received between IoT devices to an instruction associated with an operation of an IoT device, or may change the message to an expression of a general example based on a natural language processing algorithm. In this instance, the device controller 220 may serve to add a meaning to a raw message received from the IoT device based on interface information of the IoT device. For example, when data saying "23" is received from a temperature sensor corresponding to an IoT device, the device controller 220 may represent the received data together with 23 Centigrade (° C.) information or 23 Fahrenheit (° F.) information based on interface information of the corresponding temperature sensor. When an individual operation condition is present, information of the operation, for example, ON or OFF of an air conditioner may be transferred.

Also, the device controller 220 may provide control information based on setting information for each IoT device, and may infer related information for a smart service operation on a user side by performing a semantic determination based on the IoT device and external environment/service information. In this instance, the device controller 220 may perform a situation inferring function, and may determine peripheral information associated with IoT device information based on interface information between a corresponding device and a message triggered by the corresponding device using ontology information. Accordingly, the device controller 220 may select optimal vocabulary based on a function of inferring peripheral information associated with IoT device information and may recommend the selected vocabulary.

Figure 3:
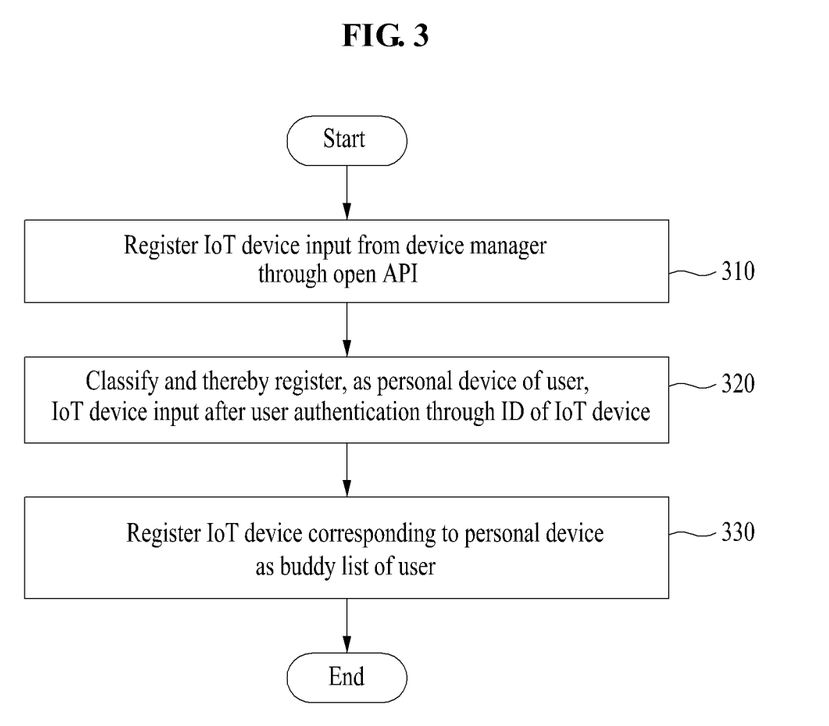
FIG. 3 is a flowchart illustrating an example of a process of registering an IoT device to a messenger server according to an embodiment of the present invention.

FIG. 3 is a flowchart illustrating an example of a process of registering an IoT device to a messenger server according to an embodiment of the present invention. Operations included in the IoT device registration process according to an embodiment may be performed by the device register 210 of FIG. 2.

In operation 310, the device register 210 may register an IoT device as a virtual buddy form by registering device information of the IoT device input from a device manager, for example, a developer or a seller of the IoT device, through an open API of a messenger server.

In operation 320, when a user performs a user authentication, for example, a log-in, and requests a registration of the IoT device by inputting identification information, for example, a MAC address and an ID provided from the device manager, of the IoT device, the device register 210 may classify and thereby register the IoT device as a personal device of the user.

In operation 330, the device register 210 may register the IoT device registered as the personal device of the user to a buddy list of the user by adding the IoT device as a buddy having set a relationship with the user on a messenger.

When the device manager or the user is directly connectable to the Internet over a wired/wireless network, the device manager or the user may register the IoT device as a buddy of the user on the messenger through the IoT device registration process of FIG. 3.

In contrast, when the device manager or the user is not directly connectable to the Internet, the device manager or the user may utilize a device that serves as a receiver for each technology such as ZigBee and Bluetooth and is provided in a gateway form for an Internet access.

Figure 4:
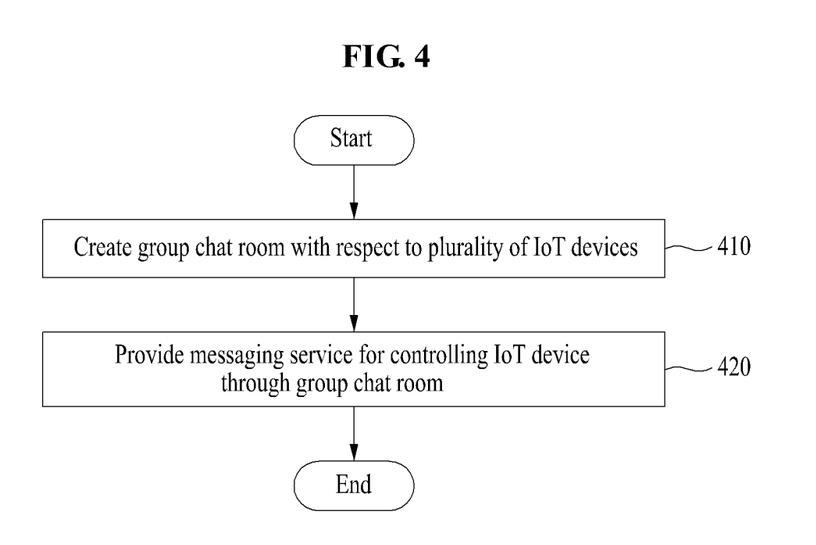
FIG. 4 is a flowchart illustrating an example of a process of controlling an IoT device according to an embodiment of the present invention.

FIG. 4 is a flowchart illustrating an example of a process of controlling an IoT device according to an embodiment of the present invention. Operations included in the IoT device control process according to an embodiment may be performed by the device controller 220 of FIG. 2.

In operation 410, the device controller 220 may create a group chat room with respect to a plurality of IoT devices. As an example, the device controller 220 may create a group chat room in which a plurality of IoT devices participates using a method of receiving a selection of the user as a conversation buddy on the plurality of IoT devices from a buddy list of a messenger. As another example, the device controller 220 may combine IoT devices registered to a buddy list of a user based on a service category of each IoT device, and may create a group chat room participated in by IoT devices for each combination. For example, when IoT devices, for example, an external service server such as a weather center, a TV, a lighting, a motion sensor, and a CCTV, are classified into a security service, a group chat room in which buddies of a service category corresponding to the security service are invited may be automatically created. As another example, when IoT devices such as a TV, a watch, a curtain, and a coffee port, are classified into an alarm service, a group chat room in which buddies of a service category corresponding to the alarm service are invited may be automatically created. In this instance, the device controller 220 may provide a correction function of adding or deleting a conversation buddy for each group chat room.

In operation 420, the device controller 220 may provide a messaging service for controlling an IoT device through the group chat room. That is, the device controller 220 may control the IoT device through a conversation type instruction based on a message service using the group chat room. Accordingly, the IoT device may transmit and receive a device message to and from a user and/or another IoT device using a conversation type instruction through an open API of a messenger server.

Figure 5:
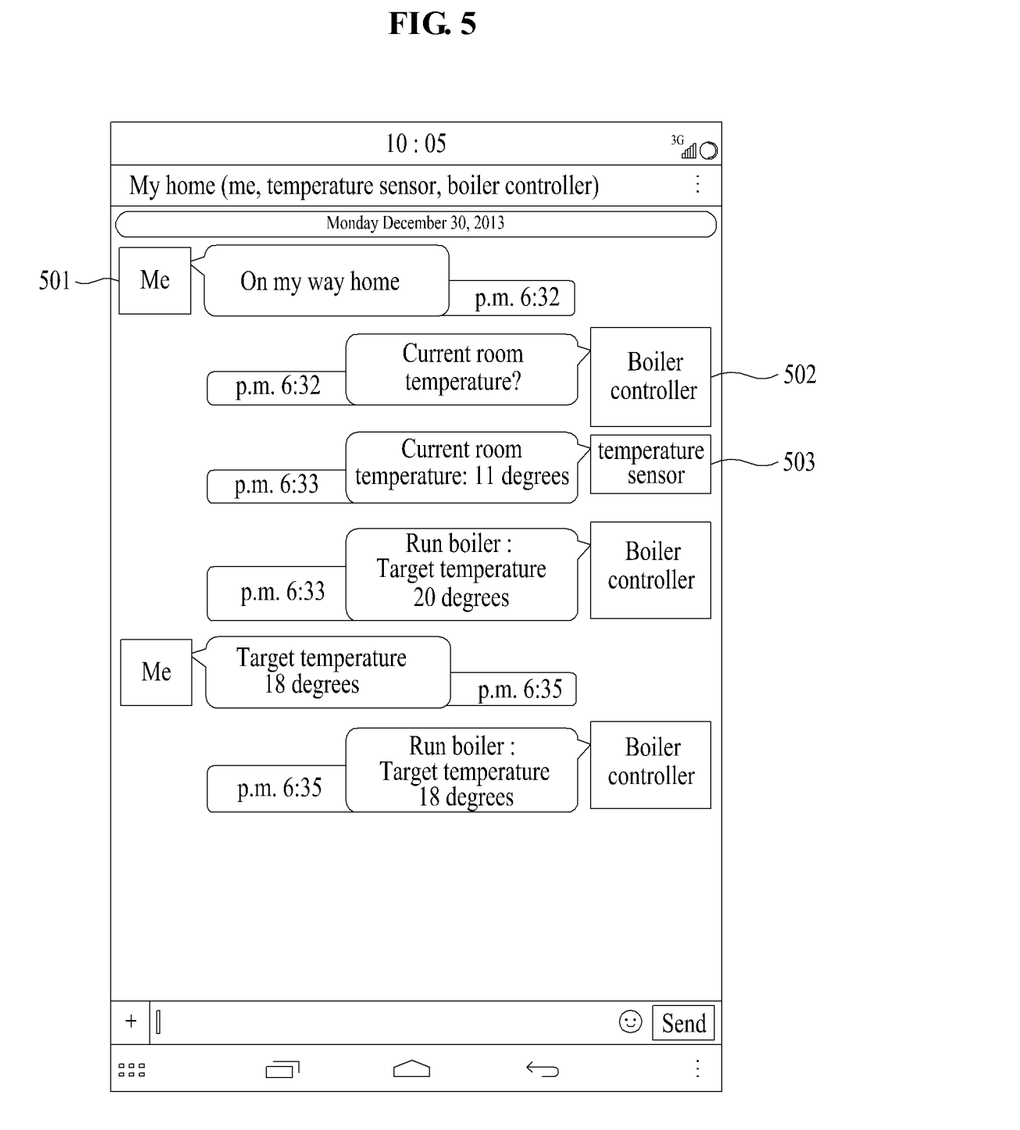
FIGS. 5 through 9 illustrate examples of a service screen for controlling a group of IoT devices according to an embodiment of the present invention.
Figure 6:
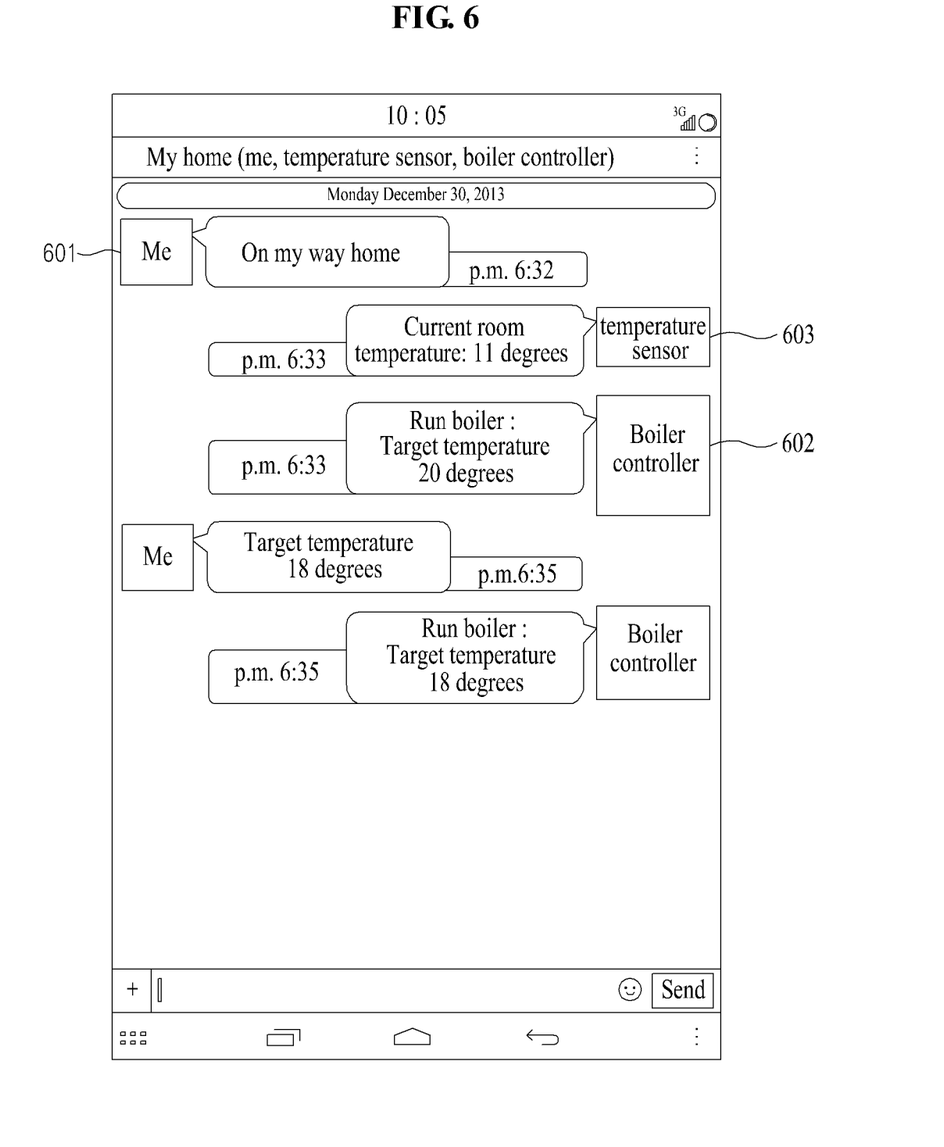

FIGS. 5 and 6 illustrate an example of a group chat screen for a temperature control service according to an embodiment of the present invention. Here, the group chat screen shows a scenario for controlling a boiler in a situation in which a boiler controller and a temperature sensor are grouped into a temperature control service group as a conversation buddy of a user.

Referring to FIG. 5, when a user 501 inputs a predetermined service control-oriented message, for example, "on my way home", "leaving the office", and "turn on the boiler", on the group chat screen, a boiler controller 502 initially requests temperature information. When a temperature sensor 503 transmits a current room temperature in response thereto, the boiler controller 502 may run the boiler by setting a target temperature based on the current room temperature. In this instance, the user 501 may transfer a message associated with the target temperature and thereby manually change the target temperature set by the boiler controller 502.

Referring to FIG. 6 illustrating another scenario for controlling a boiler, when a user 601 inputs a predetermined service control-oriented message on the group chat screen, a messenger server may verify an action of the user 601 based on a message on a messenger service and may request a temperature sensor 603 for temperature information. A boiler controller 602 may run the boiler by setting a target temperature based on a current room temperature.

In the case of the scenario of FIG. 5 in which an entity, such as the boiler controller 502, capable of initially requesting information and then controlling the boiler is present, it is possible to manage and control IoT devices present within service providing coverage through the boiler controller 502. Meanwhile, in the case of the scenario of FIG. 6, it is possible to verify, using the messenger server, an action or a conversation of the user 601, for example, "on the way home", "leaving the office", and "turn on the boiler", and to request temperature information, and accordingly, to manage and control IoT devices present within service providing coverage through the boiler controller 602. In the case of the scenario of FIG. 6, a messenger service provider associated with the messenger server may charge for a service scenario or a device management.

Figure 7:
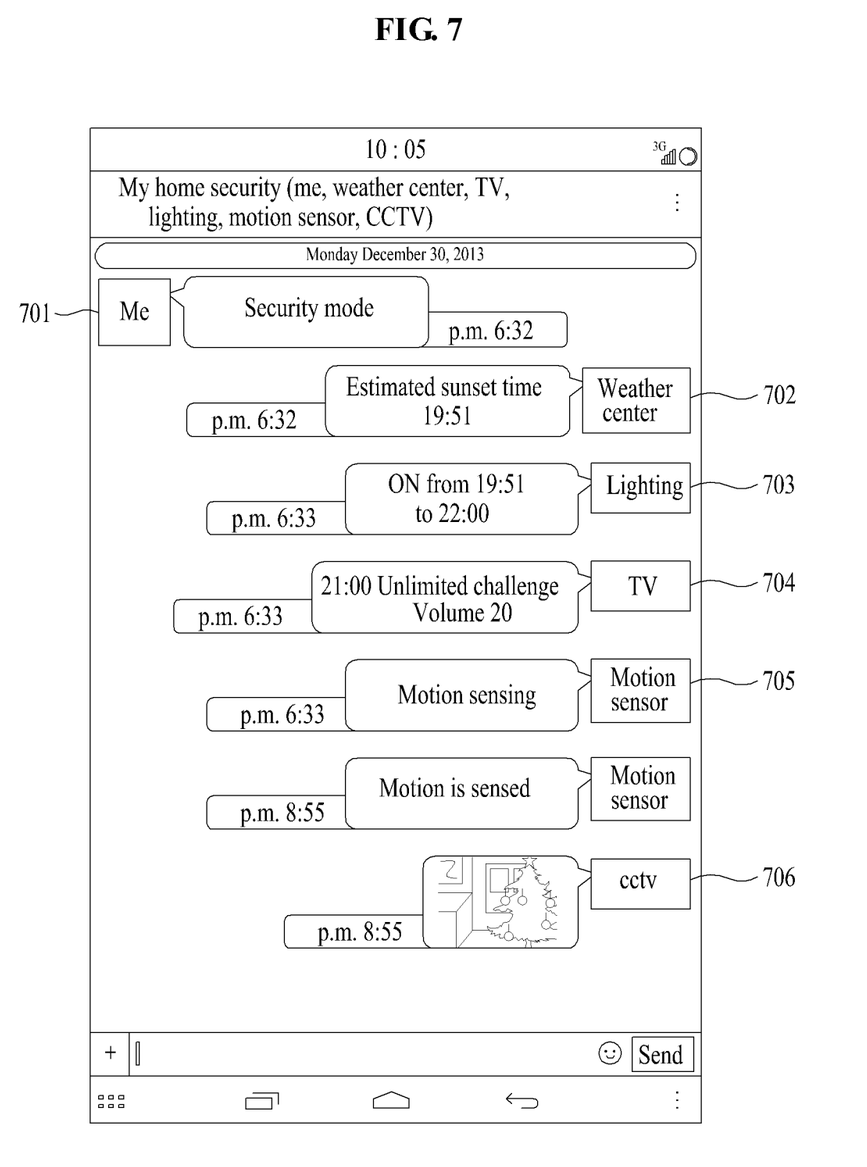

FIG. 7 illustrates an example of a group chat screen for a security service according to an embodiment of the present invention. Here, the group chat screen shows a scenario for activating a security service in a situation in which a weather center, a TV, a lighting, a motion sensor, and a CCTV are grouped into a security service group as a conversation buddy of a user.

Referring to FIG. 7, when a user 701 inputs a predetermined service control-oriented message, for example, "security mode" and "ON", on the group chat screen, a weather center 702 that is an external service provides information about an estimated sunset time. In this instance, a lighting 703, a TV 704, and a motion sensor 705 perform an operation corresponding to a predetermined condition based on the estimated sunset time, and a CCTV 706 provides a current indoor image when a motion is sensed at the motion sensor 705.

Figure 8:
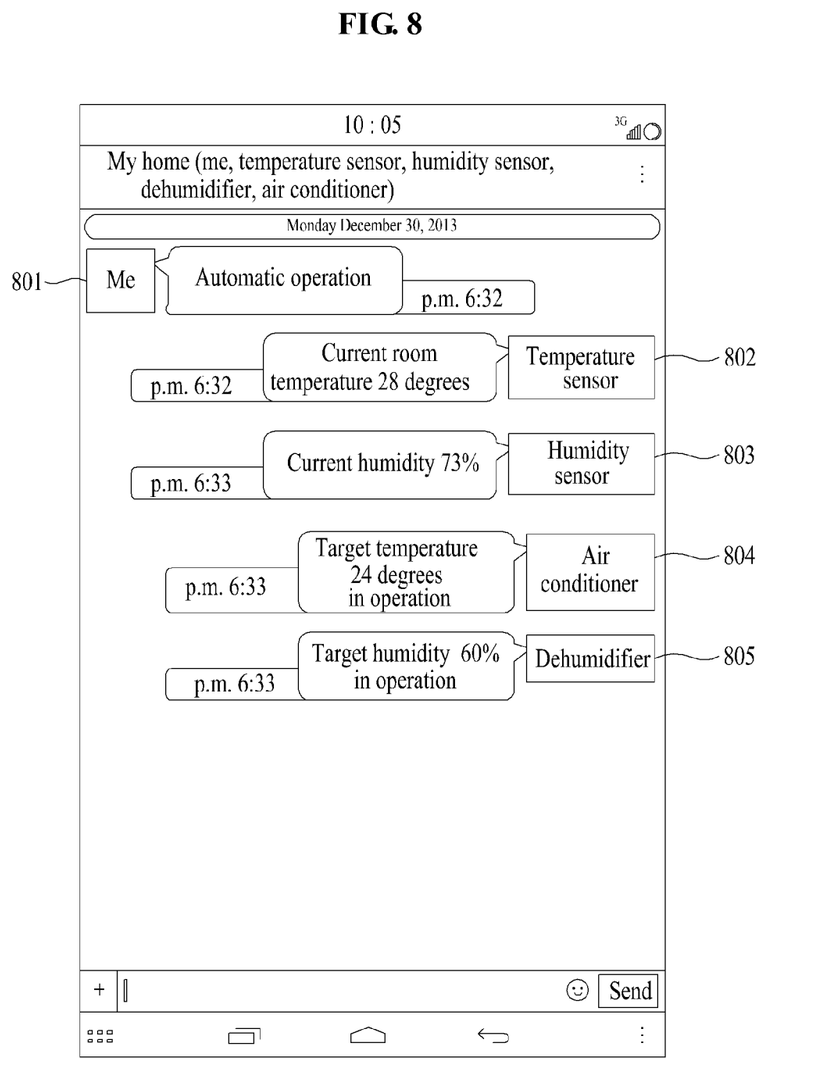

FIG. 8 illustrates an example of a group chat screen for a temperature/humidity control service according to an embodiment of the present invention. Here, the group chat screen shows a scenario for adjusting a room temperature/humidity in a situation in which a temperature sensor, a humidity sensor, an air conditioner, and a dehumidifier are grouped into a temperature/humidity control service group as a conversation buddy of a user.

Referring to FIG. 8, when a user 801 inputs a predetermined service control-oriented message, for example, "automatic operation" and "ON", on the group chat screen, a temperature sensor 802 and a humidity sensor 803 measure a current temperature and a current humidity. Accordingly, an air conditioner 804 and a dehumidifier 805 set a target level based on the current temperature and the current humidity, and perform a predetermined operation.

Figure 9:
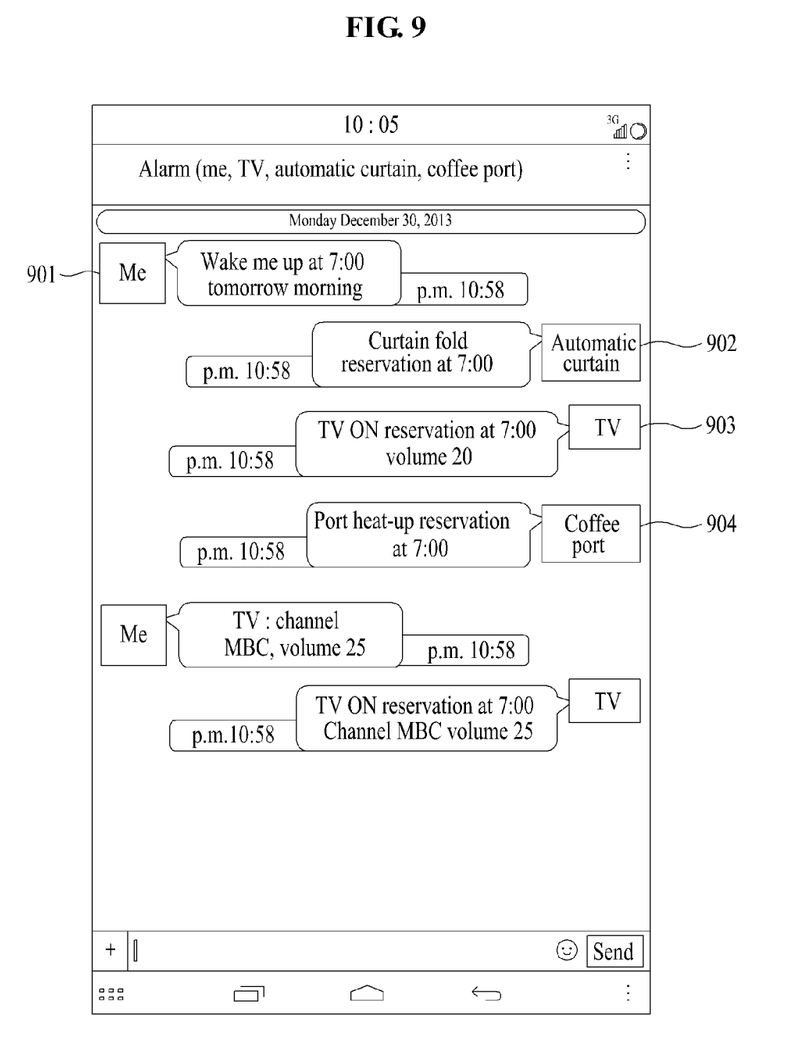

FIG. 9 illustrates an example of a group chat screen for an alarm service according to an embodiment of the present invention. Here, the group chat screen shows a scenario for providing an alarm in a situation in which a TV, an automatic curtain, and a coffee port are grouped into an alarm service group as a conversation buddy of a user.

Referring to FIG. 9, when a user 901 inputs a predetermined service control-oriented message, for example, "7:00 a.m." and "wake me up at 7:00 a.m.", an alarm time may be verified by verifying the message and an automatic curtain 902, a TV 903, and a coffee port 904 may perform a predetermined operation based on the alarm time. Here, the user 901 may manually control an alarming operation by transferring a message type instruction, for example, "TV: channel-MBC, volume-25", to a predetermined IoT device.

FIGS. 5 through 9 show examples of an environment capable of easily configuring a mash-up service and exchanging information between IoT devices through a group chat room. A user may perform group chatting with IoT devices associated with a desired service. When the user transfers an instruction in a conversation type, IoT devices within a corresponding group may analyze the instruction of the user and may operate to fit for a service desired by the user.

Further, an external service provider, for example, a weather center and a traffic center, may also be registered as a single IoT buddy, and may provide valid information to a user for payment or free of charge in a messenger environment. For example, the external service provider may be registered in advance on a messenger service to be selectively registered as a buddy by the user.

Figure 10:
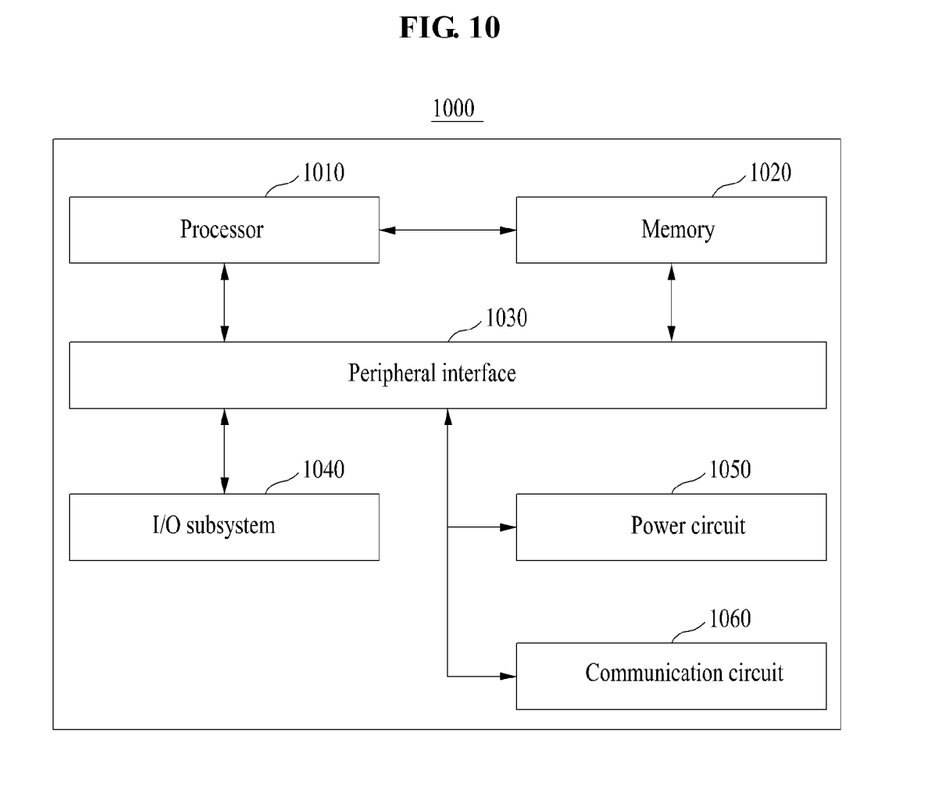
FIG. 10 is a block diagram illustrating an example of a configuration of a computer system according to an embodiment of the present invention.

FIG. 10 is a block diagram illustrating an example of a configuration of a computer system 1000 according to an embodiment of the present invention. The computer system 1000 may include at least one processor 1010, a memory 1020, a peripheral interface 1030, an I/O subsystem 1040, a power circuit 1050, and a communication circuit 1060. Here, the computer system 1000 may correspond to a user terminal.

The memory 1020 may include, for example, a high-speed random access memory (HSRAM), a magnetic disk, a static random access memory (SRAM), a dynamic RAM (DRAM), read only memory (ROM), a flash memory, and a non-volatile memory. The memory 1020 may include a software module, an instruction set, or a variety of data required for an operation of the computer system 1000. Here, an access from another component such as the processor 1010 and the peripheral interface 1030 to the memory 1020 may be controlled by the processor 1010.

The peripheral interface 1030 may couple an input device and/or output device of the computer system 1000 with the processor 1010 and the memory 1020. The processor 1010 may perform a variety of functions for the computer system 1000 and process data by executing the software module or the instruction set stored in the memory 1020.

The I/O subsystem 1040 may couple various I/O peripheral devices with the peripheral interface 1030. For example, the I/O subsystem 1040 may include a controller for coupling the peripheral interface 1030 and a peripheral device such as a monitor, a keyboard, a mouse, a printer, and a touch screen or a sensor, as necessary. The I/O peripheral devices may be coupled with the peripheral interface 1030 without using the I/O subsystem 1040.

The power circuit 1050 may supply a power to all of or a portion of components of a terminal. For example, the power circuit 1050 may include a power management system, at least one power source such as a battery and alternating circuit (AC), a charge system, a power failure detection circuit, a power converter or inverter, a power status indicator, or other components for creating, managing and distributing power.

The communication circuit 1060 enables communication with another computer system using at least one external port. Alternatively, as described above, the communication circuit 1060 may enable communication with another computer system by including a radio frequency (RF) circuit and thereby transmitting and receiving an RF signal known as an electromagnetic signal.

The embodiment of FIG. 10 is only an example of the computer system 1000. The computer system 1000 may have a configuration or an arrangement for omitting a portion of the components illustrated in FIG. 10, further including components not illustrated in FIG. 10, or coupling two or more components. For example, a computer system for a communication terminal of a mobile environment may further include a touch screen, a sensor, and the like, in addition to the components of FIG. 10. A circuit for RF communication using a variety of communication methods, for example, wireless fidelity (Wi-Fi), 3rd generation (3G), long term evolution (LTE), Bluetooth, near field communication (NFC), and ZigBee may be included in the communication circuit 1060. Components includable in the computer system 1000 may be configured as hardware that includes an integrated circuit specified for at least one signal processing or application, software, or a combination of hardware and software.

The methods according to the embodiments of the present invention may be configured in a program instruction form executable through various computer systems and thereby recorded in non-transitory computer-readable media.

A program according to the embodiment may be configured as a PC-based program or an application exclusive for a mobile terminal. A messenger App according to the embodiment may be configured in a form of an independently operating program or in an in-app form of a predetermined application to be operable on the predetermined application.

As described above, according to embodiments of the present invention, users may be provided with an intelligent service by grouping IoT devices through a user friendly interface instead of using a difficult tool. Also, according to embodiments of the present invention, it is possible to easily perform grouping or construct a mash-up service by registering, using a buddy system such as a messenger, each IoT device as a virtual buddy, by creating a multilateral chat room, and by inviting a plurality of IoT buddies to the created multilateral chat room. Also, according to embodiments of the present invention, since IoT buddies exchange messages through a messenger server, an exclusive application or an additional server construction is not required. Further, since operation details of an IoT device or communication details between IoT devices remain in a chat room, logging or monitoring may be easily performed.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

Although a few example embodiments of the present invention have been shown and described, the present invention is not limited to the described example embodiments. Instead, it would be appreciated by those skilled in the art that changes may be made to these example embodiments without departing from the principles and spirit of the invention, the scope of which is defined by the claims and their equivalents.

What is claimed is:

1. An Internet of Things (IoT) control method configured as a computer, the method comprising:
   registering IoT devices as buddies through an open application programmer interface (API) of a messenger service platform associated with a messenger application;
   creating a group chat room by grouping a plurality of IoT devices among the IoT devices registered as the buddies; and
   providing a messaging service through the group chat room in which, as participants, the plurality of IoT devices participate,
   wherein each of the plurality of IoT devices participating in the group chat room transmits and receives messages associated with controlling an operation of said each of the plurality of IoT devices through the open API of the messenger service platform,
   wherein the providing comprises:
   detecting a predetermined service control-oriented message input by a user in the group chat room;
   controlling, in response to the predetermined service control-oriented message is detected in the group chat room, an operation of at least one IoT device of the plurality of IoT devices participating in the group chat room; and
   outputting, as a reply to the predetermined service control-oriented message, information on a result of the control of the operation of said at least one IoT device in the group chat room,
   wherein the creating comprises creating the group chat room by grouping the plurality of IoT devices based on a plurality of service categories associated with the IoT devices registered as the buddies, and
   wherein at least any one of the plurality of IoT devices has at least two service categories of a plurality of service categories, and controlling an operation of said at least any one of the plurality of IoT devices is differentiated depending on a service category associated with the group chat room.

2. The method of claim 1, wherein the registering comprises registering a corresponding IoT device as a buddy having set a relationship with a user, in response to identification information of the IoT device input from the user.

3. The method of claim 1, wherein the registering comprises:
   registering an IoT device based on device information input from a manager associated with a development or sales of the IoT device; and
   registering a corresponding IoT device as a buddy having set a relationship with a user, in response to identification information of the IoT device input from the user of which a user authentication is completed.

4. The method of claim 1, wherein the creating comprises creating the group chat room by grouping a plurality of IoT devices selected by a user from among IoT device registered as the buddies.

5. The method of claim 1, further comprising:
   registering, as the buddy, an external service server that provides data required for controlling the IoT device, wherein the creating comprises creating the group chat room by comprising at least one external service server.

6. The method of claim 1, wherein the providing comprises configuring a mash-up service using the plurality of IoT devices.

7. An Internet of Things (loT) control system comprising:
a memory to which at least one program is loaded; and
at least one processor,
wherein, according to a control of the at least one program, the at least one processor is configured to process:
a process of registering IoT devices as buddies through an open application programmer interface (API) of a messenger service platform associated with a messenger application;
a process of creating a group chat room by grouping a plurality of IoT devices among the IoT devices registered as the buddies; and
a process of providing a messaging service through the group chat room in which, as participants, the plurality of IoT devices participate,
wherein each of the plurality of IoT devices participating in the group chat room transmits and receives messages associated with controlling an operation of said each of the plurality of IoT devices through the open API of the messenger service platform,
wherein the process of providing comprises:
a process of detecting a predetermined service control-oriented message input by a user in the group chat room;
a process of controlling, in response to the predetermined service control-oriented message is detected in the group chat room, an operation of at least one IoT device of the plurality of IoT devices participating in the group chat room; and
a process of outputting, as a reply to the predetermined service control-oriented message, information on a result of the control of the operation of said at least one IoT device in the group chat room, and
wherein the process of creating comprises a process of creating the group chat room by grouping the plurality of IoT devices based on a plurality of service categories associated with the IoT devices registered as the buddies, and
wherein at least any one of the plurality of IoT devices has at least two service categories of a plurality of service categories, and controlling an operation of said at least any one of the plurality of IoT devices is differentiated depending on a service category associated with the group chat room.

8. The IoT control system of claim 7, wherein the process of registering is to register an IoT device based on device information input from a manager associated with a development or sales of the IoT device, and to register a corresponding IoT device as a buddy having set a relationship with a user, in response to identification information of the IoT device input from the user of which a user authentication is completed.

9. The IoT control system of claim 7, wherein the process of creating is to create the group chat room by grouping a plurality of IoT devices based on a service category of the IoT devices registered as the buddies.

10. The IoT control system of claim 7, wherein the at least one processor is further configured to process:
a process of registering, as a buddy, an external service server that provides data required for controlling at least one IoT device among the IoT devices registered as the buddies, and
the process of creating is to create the group chat room by comprising at least one external service server.

11. The IoT control system of claim 7, wherein the process of providing is to configure a mash-up service using the plurality of IoT devices.

* * * * *